(12) United States Patent
Liang et al.

(10) Patent No.: US 11,667,831 B2
(45) Date of Patent: Jun. 6, 2023

(54) ENZYME-ENCAPSULATED HYDROGEL NANOPARTICLES FOR HYDRAULIC FRACTURING FLUID CLEANUP

(71) Applicant: Texas A&M University, College Station, TX (US)

(72) Inventors: Jenn-Tai Liang, College Station, TX (US); Hulli Guan, College Station, TX (US)

(73) Assignee: Texas A&M University, College Station, TX (US)

(*) Notice: Subject to any disclaimer, the term of this patent is extended or adjusted under 35 U.S.C. 154(b) by 67 days.

(21) Appl. No.: 17/032,745

(22) Filed: Sep. 25, 2020

(65) Prior Publication Data

US 2021/0009891 A1 Jan. 14, 2021

Related U.S. Application Data

(63) Continuation of application No. PCT/US2019/024002, filed on Mar. 26, 2019.

(Continued)

(51) Int. Cl.
*C09K 8/70* (2006.01)
*C09K 8/524* (2006.01)
(Continued)

(52) U.S. Cl.
CPC .............. *C09K 8/706* (2013.01); *C09K 8/524* (2013.01); *C09K 8/536* (2013.01); *C09K 8/68* (2013.01);
(Continued)

(58) Field of Classification Search
CPC ........ C09K 8/706; C09K 8/524; C09K 8/536; C09K 8/68; C09K 8/90; C09K 2208/10; C09K 2208/24
See application file for complete search history.

(56) References Cited

U.S. PATENT DOCUMENTS 5,437,331 A 8/1995 Gupta et al.
5,562,160 A 10/1996 Brannon et al.
(Continued)

FOREIGN PATENT DOCUMENTS

WO 200134939 A1 5/2001
WO 2016173973 A1 11/2016
(Continued)

OTHER PUBLICATIONS

Afolabi, Richard O. and Yusuf, Esther O., "Nanotechnology and Global Energy Demand: Challenges and Prospects for a Paradigm Shift in the Oil and gas Industry," Journal of Petroleum Exploration and Production Technology, 9:1423-1441 (Aug. 24, 2018).
(Continued)

*Primary Examiner* — Crystal J. Lee
(74) *Attorney, Agent, or Firm* — Benjamin Aaron Adler

(57) ABSTRACT

Provided herein is a hydraulic fracturing fluid containing enzyme encapsulated hydrogel nanoparticles and a breaker composition of a viscosifier-degrading enzyme encapsulated in the hydrogel nanoparticle. Also provided are methods for hydraulic fracturing utilizing hydrogel nanoparticles encapsulating an enzyme as a breaker to prevent the premature degradation of the fracturing fluid, to improve transport and placement of the proppant and to facilitate subsequent cleaning of the fracturing fluid.

8 Claims, 2 Drawing Sheets

Related U.S. Application Data

(60) Provisional application No. 62/648,520, filed on Mar. 27, 2018.

(51) Int. Cl.
  *C09K 8/536* (2006.01)
  *C09K 8/68* (2006.01)
  *C09K 8/90* (2006.01)
  *B82Y 30/00* (2011.01)
  *B82Y 40/00* (2011.01)

(52) U.S. Cl.
  CPC ............. *C09K 8/90* (2013.01); *B82Y 30/00* (2013.01); *B82Y 40/00* (2013.01); *C09K 2208/10* (2013.01); *C09K 2208/24* (2013.01); *C12Y 302/01004* (2013.01); *C12Y 302/01015* (2013.01)

(56) References Cited

U.S. PATENT DOCUMENTS

| | | | |
|---|---|---|---|
| 5,604,186 | A | 2/1997 | Hunt et al. |
| 6,209,646 | B1 | 4/2001 | Reddy et al. |
| 6,225,262 | B1 | 5/2001 | Irwin et al. |
| 6,357,527 | B1 | 3/2002 | Norman et al. |
| 7,721,804 | B2 | 5/2010 | Duenckel et al. |
| 8,695,704 | B2 | 4/2014 | Muthusamy et al. |
| 9,068,109 | B2 | 6/2015 | Rana et al. |
| 2001/0016562 | A1 | 8/2001 | Muir et al. |
| 2005/0130845 | A1 | 6/2005 | Freeman et al. |
| 2010/0267594 | A1* | 10/2010 | Rana ............... A61Q 19/00 264/4.32 |
| 2015/0267105 | A1* | 9/2015 | Kremer ............. C09K 8/035 507/201 |
| 2017/0204316 | A1 | 7/2017 | Pop et al. |

FOREIGN PATENT DOCUMENTS

| | | | |
|---|---|---|---|
| WO | WO-2016173973 A1 * | 11/2016 | ........... C08L 71/08 |
| WO | 2017177176 A1 | 10/2017 | |
| WO | 2018086984 A1 | 5/2018 | |

OTHER PUBLICATIONS

Fakoya, Muili Feyisitan and Shah, Subhash Nandlal, "Emergence of Nanotechnology in the Oil and Gas Industry: Emphasis on the Application of Silica Nanoparticles," Petroleum 3: 391-405 (2017).

Xu et al., "Stability and Reactivity: Positive and Negative Aspects for Nanoparticle Processing," Chem Rev. 118(7) Abstract (Epub Mar. 8, 2018).

* cited by examiner

Enzyme Release

Enzyme =

ENZYME-ENCAPSULATED HYDROGEL NANOPARTICLES FOR HYDRAULIC FRACTURING FLUID CLEANUP

CROSS-REFERENCE TO RELATED APPLICATIONS

This continuing application claims benefit of priority under 35 U.S.C. § 120 of pending international application PCT/US2019/024002, filed Mar. 26, 2019, which claims benefit of priority under 35 U.S.C. § 119(e) of provisional application U.S. Ser. No. 62/648,520, filed Mar. 27, 2018, the entirety of which is hereby incorporated by reference.

BACKGROUND OF THE INVENTION

Field of the Invention

The present invention relates to methods and compositions for fracturing technologies. More specifically, the present invention relates to hydraulic fracturing methods utilizing enzyme-encapsulated hydrogel nanoparticles to control/delay the release of encapsulated enzymes to prevent premature degradation of polymers or gels in fracturing fluids for improved proppant carrying capability and to breakdown the fracturing fluids after the release of enzyme for effective fracture cleanup.

Description of the Related Art

Hydraulic fracturing is widely used by the oil and gas Industry to stimulate hydrocarbon production in both conventional and unconventional reservoirs. Multistage-fracturing in horizontal wells is responsible for the recent boom in unconventional oil and gas productions worldwide.

A main issue with hydraulic fracturing is the formation damage caused by incomplete cleanup of the water-based fracturing fluids, which is especially critical in unconventional reservoirs with tight formation rocks. Oxidizers or enzymes are commonly used to break the viscous fracturing fluids to facilitate better fracture cleanup.

Current technology including encapsulating enzyme into polymer beads, coating enzyme on proppant with polymer coating protection, entrapping enzyme into polyelectrolyte particle, etc., produces either premature or incomplete breakdown of the fracturing fluids resulting in inefficient fracture creation and incomplete fracture cleanup, respectively and thus low post-fracturing well productivity. Effective fracturing fluid cleanup is critical to the success of hydraulic fracturing in both conventional and unconventional reservoirs. There is thus a need in the art for a better method for improved cleanup of the water-based fracturing fluids and efficient fracture creation. It is further desirable that such improved method be cost-effective.

Therefore, it would be beneficial to develop technology that improves fracturing efficiency and achieves effective fracturing fluid cleanup after the completion of the fracturing operations. The present invention fulfills this longstanding need and desire in the art.

SUMMARY OF THE INVENTION

The present invention is directed to a hydraulic fracturing fluid. The hydraulic fracturing fluid comprises an aqueous solution, a proppant, a polymeric viscosifier, and a plurality of hydrogel nanoparticles encapsulating a viscosifier-degrading enzyme therein at a concentration substantially higher than a final concentration in the fracturing fluid.

The present invention is further directed to a hydraulic fracturing method. In the method, a hydraulic fracturing fluid is prepared that comprises at least an aqueous solution containing a proppant, a polymeric viscosifier and a plurality of hydrogel nanoparticles designed to delay release of an enzyme encapsulated therein at a concentration substantially higher than a final concentration of the enzyme in the fracturing fluid. The hydraulic fracturing fluid is pumped into a well to create a fracture therein, wherein the delay in release of the enzyme prevents premature degradation of the polymeric viscosifier and thereby improves transport of the proppant and placement thereof evenly within the fracture. The present invention is directed to a related hydraulic fracturing method further comprising cleaning the hydraulic fracturing fluid after creating the fracture to regain conductivity thereof. The present invention is directed to another related hydraulic fracturing method in which the hydraulic fracturing fluid as described herein is prepared.

The present invention is directed further to a breaker composition for use in a hydraulic fracturing fluid. The viscosifier-degrading composition comprises a viscosifier-degrading enzyme and a hydrogel nanoparticle encapsulating the viscosifier-degrading enzyme at a high load.

The present invention is directed further still to a method for preventing the premature degradation of fracturing fluid during a hydraulic fracturing process. In the method, hydraulic fracturing is performed with a fracturing fluid containing a plurality of enzyme encapsulated hydrogel nanoparticles designed to delay release of the enzyme into the fracturing fluid thereby preventing the premature degradation thereof. The present invention is directed to a related method for preventing the premature degradation of fracturing fluid during a hydraulic fracturing process in which hydraulic fracturing is performed with a fracturing fluid containing the breaker composition as described herein.

Other and further aspects, features, benefits, and advantages of the present invention will be apparent from the following description of the presently preferred embodiments of the invention given for the purpose of disclosure.

BRIEF DESCRIPTION OF THE DRAWINGS

So that the matter in which the above-recited features, advantages and objects of the invention, as well as others that will become clear, are attained and can be understood in detail, more particular descriptions of the invention briefly summarized above may be had by reference to certain embodiments thereof that are illustrated in the appended drawings. These drawings form a part of the specification. It is to be noted, however, that the appended drawings illustrate preferred embodiments of the invention and therefore are not to be considered limiting in their scope.

DETAILED DESCRIPTION OF THE INVENTION

Figure 1:
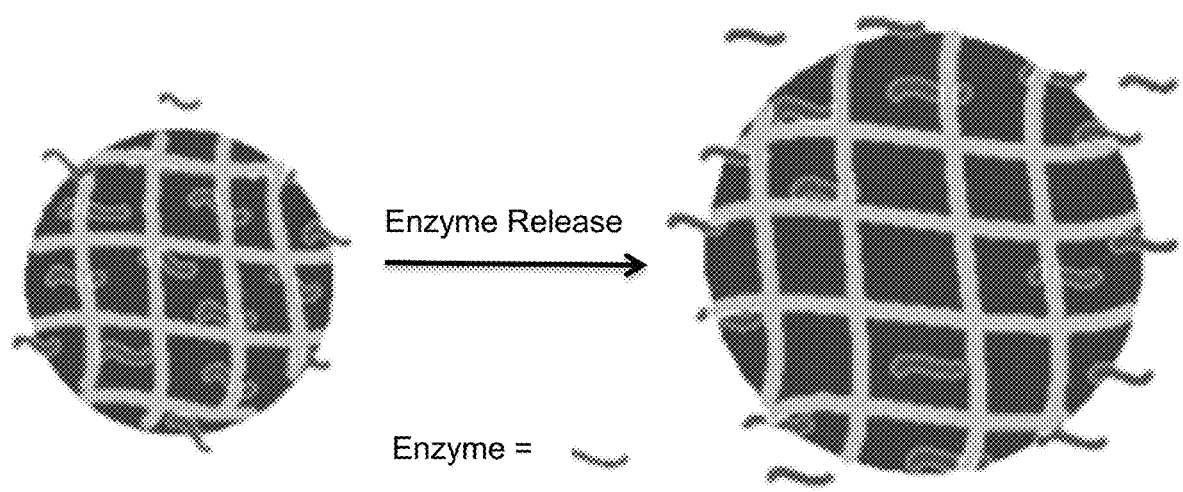
FIG. 1 illustrates the enzyme release mechanism by diffusion through swelled hydrogel particles.

As used herein in the specification, "a" or "an" may mean one or more. As used herein in the claim(s), when used in conjunction with the word "comprising", the words "a" or "an" may mean one or more than one.

As used herein "another" or "other" may mean at least a second or more of the same or different claim element or components thereof. Similarly, the word "or" is intended to include "and" unless the context clearly indicates otherwise. "Comprise" means "include."

As used herein, the term "about" refers to a numeric value, including, for example, whole numbers, fractions, and percentages, whether or not explicitly indicated. The term "about" generally refers to a range of numerical values (e.g., +1-5-10% of the recited value) that one of ordinary skill in the art would consider equivalent to the recited value (e.g., having the same function or result). In some instances, the term "about" may include numerical values that are rounded to the nearest significant figure.

As used herein, the terms "hydraulic fracturing fluid" and "fracturing fluid" are interchangeable and refer to aqueous, water or brine solutions containing at least the enzyme-encapsulated hydrogel nanoparticles described herein, as a breaker, and a viscosifier and a proppant as are known and standard in the art and, optionally, other chemical additives as are known and standard in the art, utilized in a hydraulic fracturing method or process.

As used herein, the term "polymeric viscosifier" refers generally to a polymer or cross-linked gel which improves the ability of the fracturing fluid to transport and place the proppant evenly within a created fracture during a hydraulic fracturing method or process.

As used herein, the terms "conductivity" and "fracture conductivity" are interchangeable and refer to the property of a propped fracture to convey or conduct the fluids produced in a well and is dependent on the permeability of the proppant in the fracturing fluid and the average width of the propped fracture.

In one embodiment of the present invention there is provided a hydraulic fracturing fluid, comprising an aqueous solution; a proppant; a polymeric viscosifier; and a plurality of hydrogel nanoparticles encapsulating a viscosifier-degrading enzyme therein at a concentration substantially higher than a final concentration in the fracturing fluid.

In this embodiment, the concentration of the viscosifier-degrading enzyme may be about 10000 ppm within the hydrogel nanoparticle. The final concentration of the enzyme within the fracturing fluid may be about 0.1 ppm to about 1000 ppm. Particularly, the final concentration is about 0.2 ppm. In addition, in this embodiment, representative enzymes include but are not limited to GBW-30C or pectinase. Furthermore, the polymeric viscosifier may be a guar polymer or a crosslinked guar gel. Further still, the aqueous solution may be field brine.

In another embodiment of the present invention there is provided a hydraulic fracturing method, comprising preparing a hydraulic fracturing fluid comprising at least an aqueous solution containing a proppant, a polymeric viscosifier and a plurality of hydrogel nanoparticles designed to delay release of an enzyme encapsulated therein at a concentration substantially higher than a final concentration of the enzyme in the fracturing fluid; and pumping the hydraulic fracturing fluid into a well to create a fracture therein, wherein the delay in release of the enzyme prevents premature degradation of the polymeric viscosifier and thereby improves transport of the proppant and placement thereof evenly within the fracture.

Further to this embodiment, the method comprises cleaning the hydraulic fracturing fluid after creating the fracture to regain conductivity thereof. In this further embodiment, the cleaning step may comprise degrading the polymeric viscosifier with the enzyme released from the hydrogel nanoparticles at a rate determined by activity of the enzyme and the concentration thereof in the fracturing fluid.

In both embodiments, the concentration of the enzyme may be about 10000 ppm within the hydrogel nanoparticle. In both embodiments, the final concentration of the enzyme within the fracturing fluid may be about 0.1 ppm to about 1000 ppm. Particularly, the final concentration is about 0.2 ppm.

In both embodiments, the enzyme may be GBW-30C or pectinase. In addition, the polymeric viscosifier may be a guar polymer or a crosslinked guar gel. Furthermore, the aqueous solution may be field brine. Further still, the delay in the release of the enzyme may be determined by a combination of hydrogel particle size, enzyme content, hydrophilicity of components of the hydrogel nanoparticle, and enzyme-hydrogel interactions. Particularly, in both embodiments, the hydraulic fracturing fluid may be as described supra.

In yet another embodiment of the present invention, there is provided a breaker composition for use in a hydraulic fracturing fluid, comprising a viscosifier-degrading enzyme; and a hydrogel nanoparticle encapsulating the viscosifier-degrading enzyme at a high load.

In this embodiment, the viscosifier-degrading enzyme may be encapsulated at a high load of about 10000 ppm. A representative example of the viscosifier-degrading enzyme is GBW-30C or pectinase. In this embodiment, the hydrogel nanoparticle has enzyme release-delaying properties. For example, the release-delaying properties may be determined by a combination of hydrogel particle size, enzyme content, hydrophilicity of components of the hydrogel nanoparticle, and enzyme-hydrogel interactions.

In yet another embodiment of the present invention, there is provided a method for preventing the premature degradation of fracturing fluid during a hydraulic fracturing process, comprising performing hydraulic fracturing with a fracturing fluid containing a plurality of enzyme encapsulated hydrogel nanoparticles designed to delay release of the enzyme into the fracturing fluid thereby preventing the premature degradation thereof.

In this embodiment, the enzyme may be encapsulated within the hydrogel nanoparticle at a high concentration. For example, the high concentration is about 10000 ppm within the hydrogel nanoparticle. In an aspect of this embodiment, a concentration of enzyme required for effective fracturing fluid degradation may be substantially lower than the high concentration of the enzyme encapsulated within the hydrogel nanoparticles. In this aspect, the enzyme concentration required for effective fracturing fluid degradation may be about 0.1 ppm to about 1000 ppm in the fracturing fluid. Particularly the enzyme concentration for effective fracturing fluid degradation may be about 0.2 ppm. In this embodiment, the enzyme may be GBW-30C or pectinase. In addition, the fracturing fluid may comprise a proppant and a guar polymer viscosifier or a crosslinked guar gel viscosifier.

In this embodiment and aspect thereof, the delay in the release of the enzyme may be determined by a combination of hydrogel particle size, enzyme content, hydrophilicity of components of the hydrogel nanoparticle, and enzyme-hydrogel interactions. In this embodiment and aspect thereof, delaying release of the enzyme improves transport of a proppant by the fracturing fluid. Particularly, in this embodiment the fracturing fluid may contain the breaker composition as described supra.

Provided herein are hydraulic fracturing methods or processes and hydraulic fracturing fluids and enzyme-encapsulated hydrogel nanoparticles comprising the hydraulic fracturing fluids and utilized in the fracturing methods. The presence of the enzyme-encapsulated hydrogel nanoparticles in the hydraulic fracturing fluid prevents premature degradation of the fracturing fluid, such as degradation of the viscosifier contained therein. As is known in the art, viscosifiers are commonly used in hydraulic fracturing fluids and/or serving as a drag reducer to reduce friction during the pumping process.

Particularly, the hydrogel nanoparticles are designed or configured with components enabling the delayed release of the enzyme as described herein. This prevents premature degradation of the viscosifier. Delaying degradation of the viscosifier is critical to the proppant carrying capability of the fracturing fluids, placement of the proppant within a created fracture and effective fracturing fluid cleanup after the completion of fracturing operation to regain fracture conductivity.

The enzyme-encapsulated hydrogel nanoparticles may be synthesized by inverse-emulsion or solution polymerization methods. The enzyme-encapsulated hydrogel nanoparticles are useful to control and/or delay the release of the encapsulated enzyme as a breaker of viscosifiers, for example, but not limited to, polymers or crosslinked polymer gels. Representative examples of polymers or crosslinked polymer gels include, but are not limited to, uncrosslinked or crosslinked guar or guar derivative polymers.

The following examples are given for the purpose of illustrating various embodiments of the invention and are not meant to limit the present invention in any fashion.

Example 1

Characteristics of Enzyme-Encapsulated Hydrogel Nanoparticles

Enzyme-encapsulated hydrogel nanoparticles with delayed release of enzyme are developed to improve fracturing efficiency and to facilitate effective cleanup of hydraulic fracturing fluids which is critical to the success of hydraulic fracturing in both conventional and unconventional reservoirs.

The enzyme-encapsulated hydrogel nanoparticles have a number of advantages. For example, the enzymes are 100% encapsulated in hydrogel nanoparticles with no risk of premature breakdown of polymers by unentrapped enzymes. Secondly, enzyme-encapsulated hydrogel nanoparticles may be prepared using simple solution polymerization or inverse-emulsion polymerization methods with no specialized equipment required for commercial-scale production. Thirdly, enzyme-encapsulated hydrogel nanoparticles are very cost-effective with high enzyme loading and low enzyme concentration required for effective fracturing fluid breakdown. Further, field brine is used for mixing with fracturing fluids and thus no fresh water is required.

Loading of the enzyme GBW-30C into enzyme-encapsulated hydrogel nanoparticles was 10,000 ppm. The concentration of enzyme required for effective fracturing fluid breakdown was as low as 0.1 ppm, but can be up to about 1000 ppm. The combination of high enzyme loading and low enzyme concentration required for effective fracturing fluid breakdown translates to low treatment cost for field applications.

Example 2

Production of Enzyme-Encapsulated Hydrogel Nanoparticles

Enzyme-encapsulated hydrogel nanoparticles may be made by either inverse-emulsion polymerization or solution polymerization.

Inverse-Emulsion Polymerization

The synthetic preparation of inverse-emulsion: ultrasonication of mixture of water and oil phases while stirring, removal of oxygen via purging with nitrogen gas for 15 mins and polymerization at 52-55° C. for 2 hours (Table 1). For enzyme-encapsulated hydrogel nanoparticles prepared by inverse emulsion polymerization, a water solution containing enzyme, monomer, and cross-linker is the dispersed phase and an oil solution containing surfactant or co-surfactant is the continuous phase. During field application, enzyme-encapsulated hydrogel nanoparticles are first released into the water solution from the inversed emulsion using an inverting surfactant while stirring. Then the enzyme-encapsulated hydrogel nanoparticles released into the water solution are mixed with the fracturing fluids.

TABLE 1

| Recipe (Reaction Temperature: 52-55° C.) | | |
|---|---|---|
| Water phase | Water, g | 13.23 |
|  | N-Hydroxymentyl acrylamide , g | 4.02 |
|  | $^a$Methacrylic acid, g | 1.13 |
|  | $^a$Crosslinker: Polyethylene glycol)-600 dimethacrylate, g | 0.92 |
|  | 5000 ppm Cr(III) | 1.00 |
|  | $^b$Enzyme (GBW-30C), g | 0.51 |
|  | 10% NaOH, g | 5.19 |
| Oil phase | Span 83, g | 3.20 |
|  | Ploy(ethylene glycol) sorbitol hexaoleate, g | 1.80 |
|  | Kerosene, g | 20.00 |
| Initiator | 2-2'-Azobis(2,4-dimethylvaleronitrile (VAZO 52), mg | 30 |

$^a$Crosslinker and methacrylic acid were received from Evonik
$^b$Enzyme GBW-30C, a very effective enzyme, was received from Baker Hughes Solution Polymerization For enzyme-encapsulated hydrogel nanoparticles prepared by solution polymerization (Table 2), the hydrogel is sheared into nanoparticles using a blender or other shearing devices and then is mixed with the fracturing fluids. The rate of enzyme release may be controlled by adjusting the nanogel particle size, enzyme content, hydrophilicity of monomer used in the synthesis of hydrogel nanoparticles, enzyme-hydrogel interactions (electrostatic, steric, hydrogen bond, Vander Waal, etc., FIG. 1) or a combination thereof. The rate of degradation of the polymeric fracturing fluids may be controlled by enzyme concentration and enzymes with different activities, etc.

TABLE 2

| Recipe (Reaction Temperature: Room Temperature) | |
|---|---|
| Water, g | 30.71 |
| Hydroxyethyl acrylate , g | 3.94 |
| Polyethylene glycol) diacrylate (Mw 575), g | 0.26 |
| Enzyme (pectinase), g | 2.68 |
| pH | 5.3 |
| Initiator | APS/TEMED redox |

Example 3

Enzyme-Encapsulated Nanoparticles Prevent Premature Polymer or Gel Degradation

Figure 2:
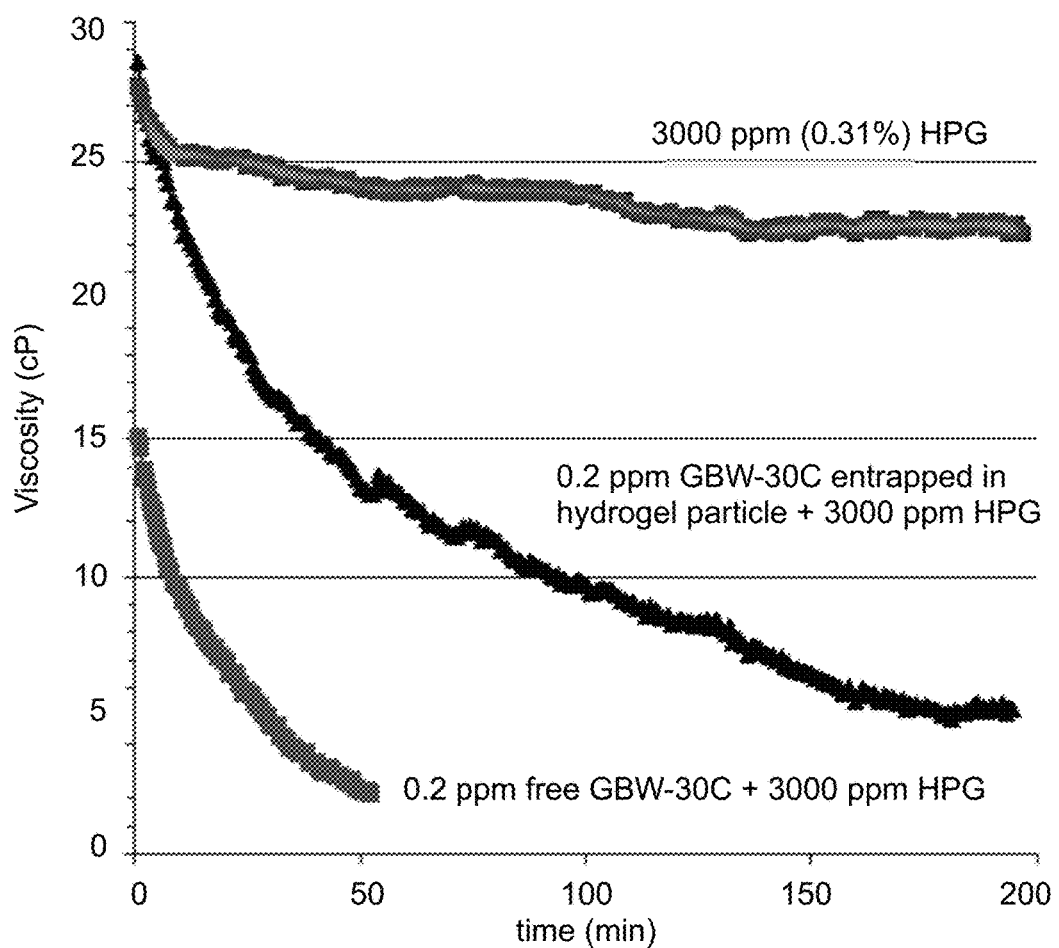
FIG. 2 shows the viscosity profiles and delay in breakdown of HPG polymer by entrapped enzyme (GBW-30C) vs. free unentrapped enzyme.
Figure 3:
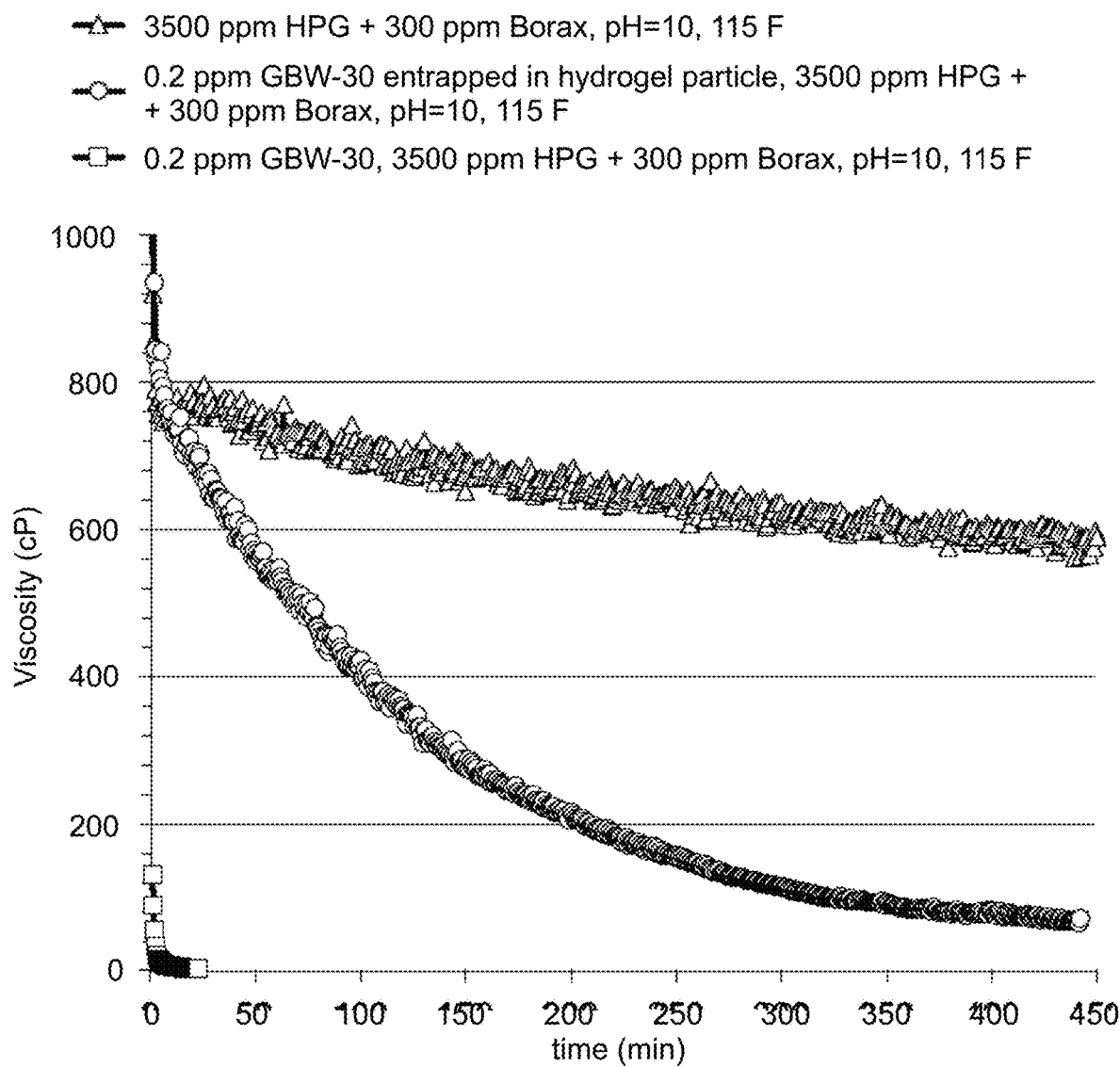
FIG. 3 shows the viscosity profiles and delay in breakdown of crosslinked HPG gel by entrapped enzyme (GBW-30 C) vs. free unentrapped enzyme.

The present invention demonstrated that enzyme-encapsulated hydrogel nanoparticles are effective in preventing HPG polymer or crosslinked HPG gel from premature degradation compared to a free unentrapped enzyme. The enzyme used is GBW-30 C (received from Baker Hughes). GBW-30 C is a very active enzyme capable of breaking 3000 ppm of HPG at a very low concentration (0.2 ppm) at 115° F. (FIG. 2). The enzyme loading in enzyme-encapsulated hydrogel nanoparticles used in the tests was 10,000 ppm, which means that the dilution factor from 10,000 ppm to 0.2 ppm is 50,000. The enzyme is also capable of breaking a strong crosslinked HPG gel (3500 ppm of HPG crosslinked with 200 ppm of Borax) at a low concentration of 0.2 ppm (FIG. 3). With the same enzyme loading of 10,000 ppm, the dilution factor in this case is 50,000. Therefore, the enzyme-encapsulated hydrogel nanoparticles are very cost-effective for hydraulic fracturing fluid cleanup.

Enzyme-encapsulated hydrogel nanoparticles are a very effective product for hydraulic fracturing fluid cleanup. The ability of the enzyme-encapsulated hydrogel nanoparticles to control the delayed release of entrapped enzyme (FIGS. 2-3) prevents the pre-matured degradation of uncrosslinked or crosslinked Guar or Guar derivative polymers, which is critical to their capability to place proppants evenly in the created fractures. After the completion of the fracturing operations, the released enzyme effectively breaks down the polymeric fracturing fluids to regain fracture conductivity.

The present invention is well adapted to attain the ends and advantages mentioned as well as those that are inherent therein. The particular embodiments disclosed above are illustrative only, as the present invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered or modified and all such variations are considered within the scope and spirit of the present invention.

What is claimed is:

1. A hydraulic fracturing fluid, comprising:
   an aqueous solution;
   a proppant;
   a polymeric viscosifier; and
   a plurality of hydrogel nanoparticles encapsulating a viscosifier-degrading enzyme therein, wherein concentration of the viscosifier-degrading enzyme is about 10000 ppm within the hydrogel nanoparticle, and wherein final concentration of the viscosifier-degrading enzyme within the fracturing fluid is about 0.1 ppm to about 1000 ppm.

2. The hydraulic fracturing fluid of claim 1, wherein the final concentration is about 0.2 ppm.

3. The hydraulic fracturing fluid of claim 1, wherein the enzyme is GBW-30C or pectinase.

4. The hydraulic fracturing fluid of claim 1, wherein the polymeric viscosifier is a guar polymer or a crosslinked guar gel.

5. The hydraulic fracturing fluid of claim 1, wherein the aqueous solution is field brine.

6. A hydraulic fracturing method, comprising:
   preparing the hydraulic fracturing fluid of claim 1 comprising at least the aqueous solution containing the proppant, the polymeric viscosifier and the plurality of hydrogel nanoparticles designed to delay release of the viscosifier-degrading enzyme encapsulated therein; and
   pumping the hydraulic fracturing fluid into a well to create a fracture therein, wherein the delay in release of the enzyme prevents premature degradation of the polymeric viscosifier and thereby improves transport of the proppant and placement thereof evenly within the fracture.

7. The hydraulic fracturing method of claim 6, wherein after creating the fracture, the method further comprises:
   degrading the polymeric viscosifier with the enzyme released from the hydrogel nanoparticles at a rate determined by activity of the enzyme and the concentration thereof in the fracturing fluid to clean the hydraulic fracturing fluid thereby regaining conductivity thereof.

8. The method of claim 6, wherein the delay in the release of the enzyme is determined by a combination of hydrogel particle size, enzyme content, hydrophilicity of components of the hydrogel nanoparticle, and enzyme-hydrogel interactions.

* * * * *